United States Patent [19]

Nelson

[11] 4,033,733
[45] * July 5, 1977

[54] AIR FILTER GAUGE

[75] Inventor: Richard D. Nelson, Decorah, Iowa

[73] Assignee: Joseph N. Nelson, Waterloo, Iowa

[ * ] Notice: The portion of the term of this patent subsequent to Feb. 17, 1993, has been disclaimed.

[22] Filed: Feb. 23, 1976

[21] Appl. No.: 660,658

[52] U.S. Cl. .................................. 55/274; 73/38; 210/90; 340/239 F
[51] Int. Cl.² .................................. B01D 46/00
[58] Field of Search ............ 55/274; 210/90; 73/38; 340/239 F

[56] References Cited
UNITED STATES PATENTS

| | | |
|---|---|---|
| 3,066,527 | 12/1962 | Stein .................................. 55/274 |
| 3,443,365 | 5/1969 | Lee et al. ............................. 55/274 |
| 3,465,707 | 9/1969 | Kashiwaba ............................ 210/90 |
| 3,928,006 | 12/1975 | Martineau ............................ 55/274 |
| 3,939,457 | 2/1976 | Nelson ................................. 55/274 |

FOREIGN PATENTS OR APPLICATIONS 345,440  2/1931  United Kingdom ............ 340/239 F

*Primary Examiner*—Bernard Nozick
*Attorney, Agent, or Firm*—Leo Gregory

[57] ABSTRACT

A gauge detecting the presence of a restriction placed upon an air stream passing through a filter in connection with an internal combustion engine, said gauge including a linear indicator to show the relative restriction present in the filter and including an indicator to show that the filter requires cleaning or replacement.

3 Claims, 6 Drawing Figures

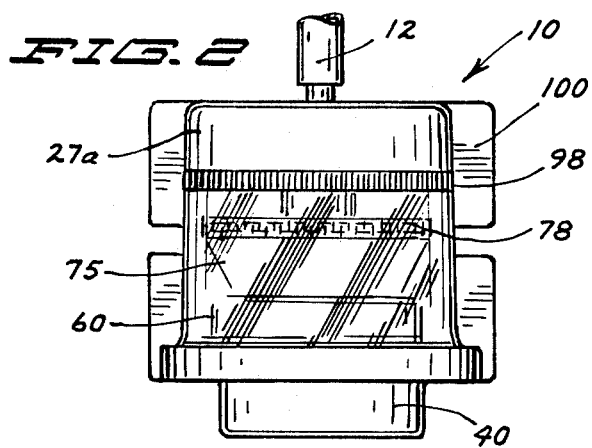
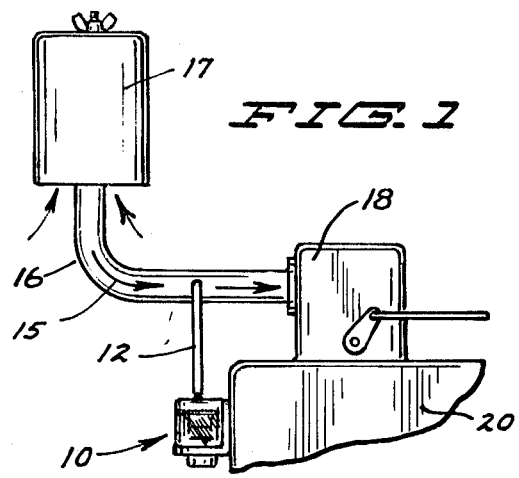
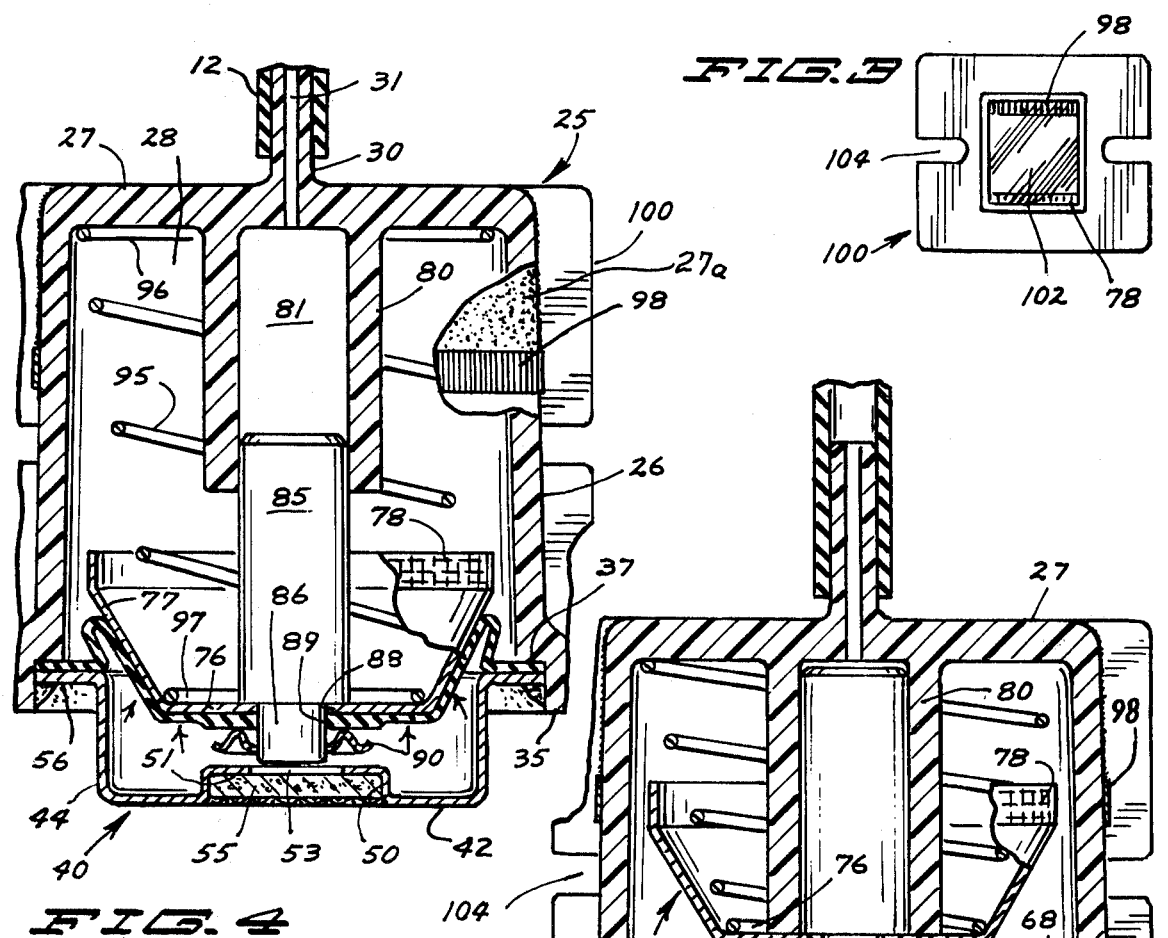
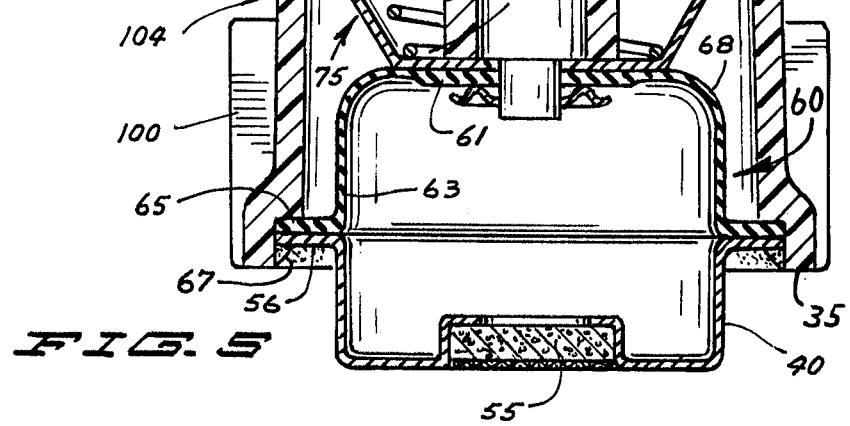

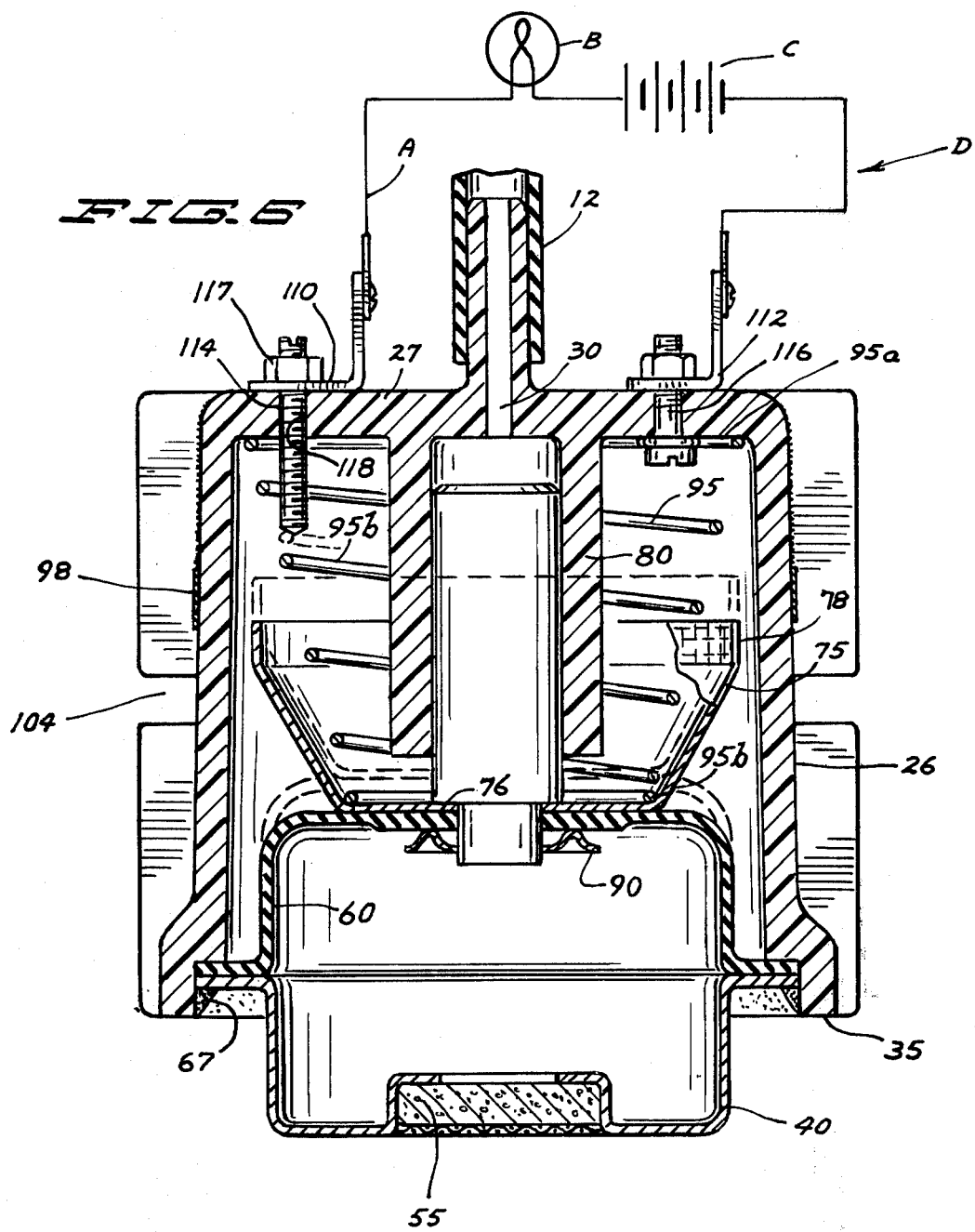

AIR FILTER GAUGE

BACKGROUND AND SUMMARY OF THE INVENTION

The device herein is used in connection with an air filter for an internal combustion engine. Said device indicates by a visible linear indication the accumulation of contaminants present in the filter placing restriction upon the air stream passing through the filter and said device further shows when the air filter has become loaded with such an accumulation of contaminants that an air stream or the combustion air can no longer in sufficient quantity pass through the filter to supply the requirement for air for efficient operation of the engine.

The device herein gives a continuous reading to indicate the build up of contaminants within an air filter to inform visibly how much usefulness is left in the air filter. The device herein does away with guess work as to the time when cleaning or replacement of the air filter is necessary and provides for maximum use of an air filter.

The device herein provides specific improvements over the structure of the copending application Ser. No. 521,697 filed Nov. 7, 1974 by the inventor herein, said improvements consisting in having the indicating member and directly related parts in a chamber sealed against outside air being drawn therein which air would bring in contaminants and the diaphragm is arranged to have a greater effective surface area engaged by atmospheric pressure to make the device capable of providing a more sensitive indication of restriction, as will be described.

It is an object of this invention to provide a device which gives a positive indication by a visible reading of the need for cleaning or replacing an air filter.

It is another object of this invention in connection with an air filter for an internal combustion engine to give a continuous visual reading of the condition of an air filter by a visible reading of a linear indicator.

More particularly stated, it is an object of this invention to provide a device as above indicated which is of a simple construction and which is readily installed in operating position such as to be readily visible to an operator.

It is also an object of this invention to provide a device to detect the restriction being placed upon an air stream passing through an air filter which device comprises a housing having a linear moveable indicating member therein bearing a readily seen color to indicate the relative condition of an air filter as to the build up of contaminants therein and as to the restriction being placed on an air stream passing therethrough and also having a readily seen indicating member which indicates that the air filter for practical purposes may be regarded as being fully restricted with respect to the futher passage of air therethrough in sufficient quantity to support combustion in an internal combustion engine, said device having a diaphragm therein adjusted for a normal operating condition as with the filter free from contamination, to provide a balance between the atmospheric pressure upon one side thereof and the partial vacuum drawn upon the other side thereof which results from the normal operation of the engine.

These and other objects and advantages of the invention will be set forth in the following description made in connection with the accompanying drawings in which like reference characters refer to similar parts throughout the several views and in which:

FIG. 1 is a broken view in elevation showing the device herein on a reduced scale in an operating position;

FIG. 2 is a view in front elevation of the device herein;

FIG. 3 is a view in rear elevation of a rear portion of the device;

FIG. 4 is a view on an enlarged scale in vertical cross-section;

FIG. 5 is a view similar to view 4 in vertical cross-section showing portions of the device in a different operating position, and FIG. 6 is a view on a somewhat larger scale showing a modification in vertical cross-section.

DESCRIPTION OF A PREFERRED EMBODIMENT

Referring to the drawings, the device 10 forming an air filter restriction detection device and comprising the subject matter of the invention herein is shown in operating position connected by a line or pipe 12 for communication with the air stream 15, indicated by arrows, passing through the air stack 16 extending from the air filter 17 to the air intake 18 of an internal combustion engine 20 which is merely indicated here by a fragmentary showing.

Referring particularly to FIG. 4, said device 10 is shown comprising a substantially cylindrical housing 25 preferably formed of a suitable plastic material. Said housing comprises an annular side wall 26 and an upper end wall 27 defining a chamber 28 within said housing and upstanding centrally from said upper wall is a stem 30 having a passage 31 therethrough communicating with said chamber 28. Said line or pipe 12 is shown connected to said stem as by a press fit.

An annular outward offset portion 35 is formed about the bottom portion of said side wall 26 and an annular right angled shoudler 37 is shown formed at the inner side of said offset portion.

Forming the lower end portion of said housing 25 is a relatively short cylindrical or cup shaped member 40 of a lesser diameter than that of said housing and having an end wall 42 and an annular side wall 44. Said end wall has a cylindrical recess 50 formed therein with the bottom wall 51 of said recess having a passage 53 therethrough. Seated in said recess and removeably secured therein is filter member 55 sufficiently porous for the free passage of air therethrough.

The side wall 44 of said member 40 terminates in a right angled flange 56 of a diameter to fit within said angled shoulder 37 as shown.

An inverted cup shaped diaphragm 60 having an end or bottom wall 61 and a side wall 63 terminating in an annular flange 65 is disposed within said housing. Said flange 65 overlies said flange 56. A suitable adhesive 67 will secure said flanges 56 and 65 within said shoulder 37.

It will be noted that there is here shown to be a substantial radius 68 between the side and bottom walls of said diaphragm.

Seated upon said diaphragm is an upright tapered cup shaped member 75 having a bottom wall 76 overlying the bottom wall 61 of said diaphragm, an annular flared side wall 77 terminating in a vertical rim portion 78, said rim portion will form a brightly colored ring such as being yellow as shown and forms a readily visible indication member or indicator which by its vertical position indicates the amount of restriction or degree of contamination in the air filter. The bottom of said member 75 has a substantially narrower width than the underlying wall portion of said diaphragm.

Said end wall 27 has a central tubular hub portion 80 depending therefrom into said chamber 28 and has a bore 81 therein. Slideably disposed into said bore 81 is a cylindrical guide member 85 having a reduced lower end portion 86. The respective end or bottom walls of said cup member 75 and of said diaphragm 60 have aligned apertures 88 and 89 through which is extended said reduced end portion 86 and the same is secured by a lock washer or lock ring 90. Said guide member is of such a length as not to be fully withdrawn from within said bore 81 when said diaphragm is folded in upon itself as indicated in FIG. 4.

Disposed within said chamber 28 is a tapered coil spring 95 having its upper end portion 96 bearing against the inner side of the end wall 27 and its lower end portion 97 being seated against the inner side of the bottom or end wall 76 of the cup shaped member 75.

Said chamber 28 is sealed away from the outer atmosphere by being in direct communication with the air line 16 and thus no air borne contaminants can affect the condition or operation of either the indicating member 78 or the spring 95.

Disposed about said housing as here shown, is a brightly colored non-transparent band 98 being in such a position that when said indicating member 75 is at its upper most position as shown in FIG. 5, its rim portion 78 will be in register with said band 97 and thus will be shielded or masked from view. The portion of said side wall 26 above said band 98 also will be made to be non-transparent as at 27a.

Integral with the housing is a mounting plate 100 here shown to be rectangular in form and having a substantially sized window 102 centrally therein which will clearly show the colored rim portion 78 and the colored band 98, the means used to indicate the condition of the air filter being used. Notches 104 are formed at each side edge portion of said mounting plate to accommodate appropriate fastening means to secure the same to the instrument panel of a vehicle or adhesive mounting tape may be used as an alternative. The housing may be mounted onto the outer side of said panel or may be mounted behind it and have said window 102 open to view through an opening in said panel. There is no illustration of a mounting on an instrument panel and the same is believed not to be necessary.

OPERATION

FIG. 4 illustrates the device in its operating position showing no restriction of the air stream passing through said filter 17. There is a normal restriction of air passing through a clean filter and adjustment is made for this in the device by calibrating the tension of the spring 95 to balance said normal restriction at one side of the diaphragm 60 with the atmospheric pressure at the other side thereof.

In FIG. 4, arrows indicate the application of atmospheric pressure to the entire downward facing surface portion of the diaphragm 60. The tapered wall of the indicator 75 causes the side walls of the diaphragm to be inclined as the diaphragm rises upwardly permitting atmospheric pressure to have a direct upward bearing on this wall surface. Were the indicator 75 to have a vertical side wall, then there would be no atmospheric pressure bearing on the corresponding underlying wall surface of said diaphragm for there would be no upward bearing atmospheric pressure in the absence of an inclination of the wall surface of said diaphragm.

Thus with the major portion of the underlying surface of said diaphragm being downward facing, there is substantial atmospheric pressure bearing against said surface making the diaphragm very sensitive and very responsive to small increments of change in the vacuum drawn on the chamber 28 caused by the degree of restriction in said air filter 17. In use, the increments of restriction may be indicated by hair lines across the face of the transparent portion of the housing 10, though here such lines are not shown.

As restriction builds up in the air filter 17 by the accumulation of contaminants therein, the flow of the stream of combustion air 15 therethrough will decrease with a result that a greater demand will be made upon it by the action or suction of the air intake of the engine 20 and this will act to reduce the pressure in the chamber 26 and as a result, atmospheric pressure will move the diaphragm 60 and cup member 75 upwardly. Thus the rim 78 of the indicating member 75 will move upwardly to indicate the presence of restriction in the air filter. The operator can estimate the useful extent of the filter 17 by the space between the rim 78 and the band 98. As indicated above, calibration lines may be applied to the housing.

When the rim 78 has moved upwardly as in FIG. 5 to become shielded by the band 97, then the filter 17 requires cleaning or replacement as the case may be.

At the beginning of a days work, upon starting up the engine, the operator can readily determine whether or not the filter will require attention and thus work stoppage during the course of the day can be avoided. The device as described is very sensitive in indicating restriction.

MODIFICATION

Referring to FIG. 6, a modification is shown of the structure above described in which like parts are indicated by like reference numerals and in which the modification consists generally of adding an electrical circuit to the device to energize and actuate a signal to audibly and/or visually alert the operator that the filter requires attention for cleaning or replacement.

A pair of terminals 110 and 112 are seated in spaced relation in said end wall 27. Said terminal 112 is secured by a nutted bolt 116 extending through said end wall through an accommodating aperture.

Said bolt 116 at its inner end engages and secures the adjacent coil 95a of the spring 95 to make contact therewith.

Said terminal 110 is shown secured by a nut 117 carried by an adjusting screw 114 which is shown here threaded through a tapped opening 118 in said end wall 27.

The inner end 115 of said adjusting screw is shown tapered and extends into the chamber 28.

The spring 95 is so arranged that when the indicator cup 75 is at the point of indicating a full restriction in the filter 17, that at such time the coil 95b of said spring 95 will come into contact with the depending portion of said screw 114 and will energize a signal circuit D. Said screw 114 will be adjusted to a precise depth within said chamber 28 to become engaged by the coil 95b as described.

The indicator member 75 and the housing 10 are formed of non-conductive material.

In circuit with said terminals 110 and 112 is a line A having in connection therewith a signal B such as a suitable known audible and/or visual signal device and included is an energy source C such as the battery of the vehicle. The entire circuit is indicated as said signal circuit D. When the air cleaner is fully restricted, the cup member 75 having the spring member 95 seated therein will be raised to raise the coil 95b of said spring 95 sufficiently to be raised to come into contact with said screw 114 and the terminal 110 to complete the signal circuit D at which time the operator will be alerted by said signal B. Thus a very simple and efficient electrical circuit has been provided.

The applicant has provided a compact and maintenance free indicating device which has operated very successfully under field conditions.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. An air filter restriction indicating device, having in combination
    a housing having a top and bottom wall and having in upstream connection therewith an air filter having an air stream passing to the air intake of an engine,
    an inverted cup shaped diaphragm disposed within said housing having an upwardly extended end wall and means securing the open end portion of said diaphragm to the housing thereabout,
    a cup shaped indicating member tapered downwardly having its bottom wall secured to said end wall of said diaphragm, the bottom wall of said indicating member having a substantially lesser width than that of the underlying wall portion of said diaphragm,
    a passage through said housing at one end thereof connected downstream of the air filter providing communication with said indicating member and said air stream,
    a passage through said housing at the other end thereof providing communication between said diaphragm and the atmosphere,
    spring means disposed within said housing bearing against said indicating member and said housing holding the same in nested position within said diaphragm with said diaphragm in infolded position and with said air filter in a clean operating position, said spring means having a compressive force such as to represent the differential between the atmospheric pressure upon said diaphragm at one side of said housing and the partial vacuum drawn by said air stream upon said indicating member at said other side of said housing,
    said housing having a transparent wall portion and an annular non-transparent portion at one end of said transparent wall portion,
    said indicating member having a rim portion visible through said transparent wall portion and having linear movement to show the progressive condition of restriction of said air filter,
    said non-transparent annular wall portion being positioned to have said rim portion in register therewith and to shield the same to indicate a full restriction of said air filter, and
    said spring means moving said indicating member in a restriction indicating position only with an air stream passing to the air intake of an engine.

2. The structure set forth in claim 1, wherein
    said indicating member has such a taper and a bottom wall of such lesser width than the underlying end wall of said diaphragm that in nesting within said diaphragm, said indicating member causes the infolded wall portion of said diaphragm to take on its tapered form to cause said wall portion of said diaphragm to be downwardly facing so as to have atmospheric pressure bearing thereagainst making said diaphragm very sensitive to samll increments of change in the vacuum drawn on the chamber thereabove caused by restrictions in said air filter.

3. The structure set forth in claim 1, including
    a pair of electrical contacts disposed through the top wall of said housing,
    an electrical circuit including a signal means and a source of energy in connection with said contacts,
    said spring means comprises a coil spring extending from the top wall of said housing and bearing against the bottom wall of said indicating member,
    one of said contacts being extendible inwardly of said housing,
    the other of said contacts being secured to a coil of said spring, and
    said one of said contacts being positioned to be engaged by a coil of said spring to close said circuit when said spring is compressed to the point that said indicating member indicates a full restriction of said air filter.

* * * * *